(12) United States Patent
Medwed et al.

(10) Patent No.: US 9,961,057 B2
(45) Date of Patent: May 1, 2018

(54) SECURING A CRYPTOGRAPHIC DEVICE AGAINST IMPLEMENTATION ATTACKS

(71) Applicant: NXP B.V., Eindhoven (NL)

(72) Inventors: Marcel Medwed, Graz (AT); Martin Feldhofer, Gratkorn (AT); Ventzislav Nikov, Leuven (BE)

(73) Assignee: NXP B.V., Eindhoven (NL)

( * ) Notice: Subject to any disclaimer, the term of this patent is extended or adjusted under 35 U.S.C. 154(b) by 35 days.

(21) Appl. No.: 14/850,886

(22) Filed: Sep. 10, 2015

(65) Prior Publication Data

US 2016/0072779 A1     Mar. 10, 2016

(30) Foreign Application Priority Data

Sep. 10, 2014 (EP) .................................... 14184296

(51) Int. Cl.
| | | |
|---|---|---|
| *H04L 29/06* | (2006.01) | |
| *H04L 9/00* | (2006.01) | |
| *H04L 9/06* | (2006.01) | |

(52) U.S. Cl.
CPC ............ *H04L 63/068* (2013.01); *H04L 9/003* (2013.01); *H04L 9/0618* (2013.01); *H04L 63/062* (2013.01); *H04L 2209/805* (2013.01)

(58) Field of Classification Search
CPC ..... H04L 63/068; H04L 9/0618; H04L 9/003; H04L 63/062; H04L 2209/805; H04L 9/0003
See application file for complete search history.

(56) References Cited

U.S. PATENT DOCUMENTS

| | | | | |
|---|---|---|---|---|
| 9,407,437 | B1* | 8/2016 | Campagna | ................ H04L 9/14 |
| 2001/0007127 | A1* | 7/2001 | Staring | ..................... H04L 9/12 |
| | | | | 713/160 |
| 2003/0188158 | A1* | 10/2003 | Kocher | ................ G06Q 20/341 |
| | | | | 713/161 |

(Continued)

OTHER PUBLICATIONS

Menezes, A. J. et al. "Handbook of Applied Crytography", "Chapter 7: Block Ciphers", CRC Press, 61 pgs, retrieved from the internet at: url:http://www.cacr.math.uwaterloo.ca/hac/, (Oct. 1, 1996).

(Continued)

*Primary Examiner* — Hosuk Song
*Assistant Examiner* — J. Brandt Murphy

(57) ABSTRACT

Methods of securing a cryptographic device against implementation attacks, are described. A disclosed method comprises the steps of obtaining a key (230) from memory of the cryptographic device; providing the key and a constant input (210) to an encryption module (240); deriving an output (250) of encrypted data bits using the encryption module (240); providing the output (250), the key (230) and an input vector (270) to a key update module (260); and using said key update module (260) to modify the key based on at least a part (270$^a$) of the input vector (270) to derive an updated key (230$^a$). This prevents the value of the key from being derived using the updated key or by using side-channel attacks because the input is constant for all keys. Additionally, by altering the input vector, the updated key is also altered.

18 Claims, 5 Drawing Sheets

(56) References Cited

U.S. PATENT DOCUMENTS

| | | | | |
|---|---|---|---|---|
| 2005/0190923 | A1* | 9/2005 | Noh | H04L 9/0618 380/278 |
| 2008/0240443 | A1* | 10/2008 | Vuillaume | H04L 9/3247 380/277 |
| 2009/0222574 | A1* | 9/2009 | Xiao | G06F 21/33 709/237 |
| 2010/0142705 | A1* | 6/2010 | Reffe | H04L 9/0643 380/46 |
| 2010/0316217 | A1* | 12/2010 | Gammel | H04L 9/0668 380/44 |
| 2013/0003966 | A1* | 1/2013 | Ihle | G06F 21/72 380/44 |
| 2013/0205379 | A1* | 8/2013 | Kang | H04L 9/3271 726/7 |
| 2014/0219443 | A1* | 8/2014 | Brainis | H04L 9/0852 380/46 |
| 2014/0281573 | A1* | 9/2014 | Jaffe | G06F 21/72 713/189 |
| 2015/0006905 | A1* | 1/2015 | Avanzi | H04L 9/0618 713/189 |
| 2015/0082033 | A1* | 3/2015 | Bruce | G06F 9/54 713/168 |
| 2016/0062921 | A1* | 3/2016 | Kim | G06F 12/1408 714/819 |
| 2016/0323100 | A1* | 11/2016 | Tsai | H04L 9/0833 |

OTHER PUBLICATIONS

Abdalla, M. et al. "Leakage-Resilent Symmetric Encryption via Re-keying", International Association for Cryptologic Research, pp. 471-488 (2013).

Medwed, M. et al. "Towards Super-Exponential Side-Channel Security with Efficient Leakage-Resilient PRFs", Crytographic Hardware and Embedded Systems, 20 pgs, retrieved from the internet at: < http://www.iacr.org/archive/ches2012/74280191/74280191.pdf (2012).

Extended European Search Report for Patent Appln. No. 14184296.3 (dated Mar. 26, 2015).

* cited by examiner

SECURING A CRYPTOGRAPHIC DEVICE AGAINST IMPLEMENTATION ATTACKS

CROSS-REFERENCE TO RELATED APPLICATIONS

This application claims the priority under U.S.C. 35 § 119 of the European patent application no. 14184296.3, filed on Sep. 10, 2014, the contents of which are incorporated by reference herein.

FIELD

This disclosure describes a method and integrated circuit for securing a cryptographic device, and in particular, a method for securing a cryptographic device against implementation attacks.

BACKGROUND

Smart devices, in particular those with low power requirements, typically called passive smart devices, are widely used for authentication and access control. Examples of such devices include contactless smart cards, which are a subset of radio-frequency identification (RFID) tags. Such passive smart devices typically use an application specific integrated circuit (ASIC).

Given the application of passive smart devices in security critical applications, cryptography is used to authenticate the passive smart device on use. Conversely, due to the desirability of the information that a passive smart device may hold or allow access to, they are also the focus of malicious attempted use.

A lot of time and effort is spent in implementation and analysis of side-channel countermeasures within security integrated circuits (ICs) like smartcards. A side-channel attack is any attack based on information gained from the physical information of a cryptographic system. Such attacks are different from a software brute force attack or an exploit or weakness in the encryption algorithms. Side-channel attacks typically examine the internal operation of the system, such as the power drawn by the system, electromagnetic (EM) emissions or other 'side-channels' to determine patterns and implementation steps. One such known side-channel attack is differential power analysis (DPA). This may involve a malicious user studying traces of power usage during use of the device and, utilising statistical analysis, determining features of the encryption algorithms.

With the use of currently available standardized algorithms and protocols, like the ones used in banking or e-government applications, attack scenarios for differential power analysis (DPA) (and differential fault attacks) are available, leading to devices implementing such protocols being threatened by such side-channel attacks (for example, because a varying input is always encrypted with the same (master) key, variations in the power signature of a system are solely or generally dependent on variations in the encryption algorithm).

One solution to such attacks uses a method of re-keying. In such a method, a session key is derived from the master key, where subsequently this session key is used for the actual operation. This session key is changed regularly in order to decrease the amount of power traces that can be obtained from the device for a specific (master) key.

A special instance of this re-keying has been applied within the CIPURSE protocol. In this approach the master key is used to derive an intermediate session key by using a random input and a function (called NLM (non-linear map)) that is easier to protect against implementation attacks. This intermediate session key is then used together with the master key to get to the used session key. (see reference US2010316217A1). The above solution to such DPA attacks relies on a random number agreement between the two parties. Such an approach prevents verification of previous transactions. In particular, it is not possible to repeat the sessions without the random numbers.

A relatively new area of research is leakage resilient cryptography. In leakage resilience (LR), it is sought to avoid having the typical DPA scenario where it is possible to attack the key of a block cipher chunk-wise (i.e. in chunks, such as byte by byte) with a varying input for every execution. In the LR approach the block cipher is executed multiple times where the complete input vector is only used chunk-wise (e.g. 1 bit at a time) and copied to the whole input state of the block cipher. In every iteration the next input chunk is used as the input (again copied to the whole state). This limits the data-complexity, i.e. the number of traces which can be used for an attack, and creates a dependency between the side-channel information of the different key chunks. However, an adversary can still apply a DPA attack due to the N>1 traces available per key.

In summary, there are still issues in performing symmetric cryptography security services (e.g. IC authentication, secure communication, key update etc.) on a low-cost IC without implementation of heavy countermeasures and the need for detailed side-channel investigations. The following disclosure aims to address these problems.

SUMMARY

According to a first aspect of the invention, there is provided a method for securing a cryptographic device against side-channel attacks, the method comprising:

obtaining a key from memory of the cryptographic device;

providing the key and a constant input of data bits to an encryption module;

deriving an output of encrypted data bits using the encryption module;

providing the output, the key and an input vector to a key update module; and using said key update module to modify the key based on at least a part of the input vector to derive an updated key Using a key in this manner reduces or removes the need for attack countermeasures in the underlying encryption module and also prevents detailed side-channel investigations. Because of the key update techniques used, the updated key cannot be used to derive the original, master key by a side-channel attack. The transitions applied by the key update module require knowledge of the original master key because they use the output of the encryption module derived from the input vector and the key. Furthermore, because the (plaintext) input to the encryption module is constant, there is only a single power trace obtainable. This provides security against side-channel attacks such as DPA that attempt to apply statistical analysis to the power management traces of cryptographic processes and algorithms.

In embodiments of the present disclosure, the method further comprises the steps of providing the updated key and the constant input to the encryption module; and deriving an updated output using the encryption module.

Such embodiments improve the security of the updated key by supplying an updated output that has been derived from the updated key and a supplied input vector. Because the updated output has been encrypted with the updated key, rather than the original master key, the security of the original master key is preserved.

Furthermore, the method can further comprise the steps of: providing the updated output, the updated key and the input vector to the key update module; and using said key update module to modify the updated key based on at least a second part of the input vector. By further modifying the updated key, this step moves the further updated key away from the master key.

The input vector can comprise two or more parts. Accordingly, such method steps can be repeated for each part of the input vector. In particular, the steps of providing the updated key and the constant input to the encryption module; and deriving an updated output using the encryption module and providing the updated output, the updated key and the input vector to the key update module; and updating the updated key using the key update module can be iterated a number of times equal to the number of parts of the input vector.

In other words, the input vector can be provided chunkwise (i.e. in chunks, such as bytes or bits). For example, for an input vector of 128 bit length, the input vector may be considered to comprise 64 parts or chunks, each part being 2 bits long. A pseudo-random output may then be derived by means of the pseudo-random function. Accordingly, the key update module may be considered as acting as a step of a pseudo-random function, processing the input vector and the key to derive a pseudo-random output, such as an updated key, based on values of at least part of the input vector. In this consideration, the input vector and the key are inputs to the pseudo-random function.

In embodiments, one or more additional input vectors may be provided. A pseudo-random output may then be derived for each additional input vector using the pseudo-random function. Each pseudo-random output may then be concatenated to form a larger pseudo-random output.

The parts of the input vector can comprise the values of at least a string of bits. Additionally or alternatively, the parts of the input vector can be the values of at least one bit of the input vector. Accordingly, the key update module can derive the updated key based on the value of a bit of the input vector. The key update module can act to apply a defined key update protocol to modify the key or the updated key dependent upon the value of a bit or bits of the input vector. For example, a bit value of 0 for bit 0 may instruct the key update function to rotate selected bits of the key to the right by 1 bit position. Conversely, a bit value of 1 for bit 0 may instruct the key update function to rotate the same or other bits of the key to the right by 2 bit positions. Other permutations are available depending upon the algorithms available to the update function.

As noted above, based on the value of a bit of the input vector, the key update module can transform or modify the key or the previous updated key using one or more of compression, expansion or permutation operations.

Utilising iterations increases the complexity of the dependency between the originally obtained key, known as the master key, and the updated key, thus making it more difficult to derive a key higher up in the key tree. This in turn counteracts key recovery by means of differential fault analysis, in particular for the originally obtained master key. Furthermore, because each key only uses the same input, i.e. the input provided to each encryption module is constant, the power trace for each key iteration is the same and therefore the power measurement of each key is resilient to differential power analysis attacks as described above.

In some examples, the key update module can rotate the value of output or the updated output by a number of bits. For example, the number of bits may be dependent on the value of at least a part of the input vector.

Alternatively or additionally, the updated key can be a concatenation of at least part of the key or the previous updated key and at least part of the updated output. As noted above, the output of the encryption module is provided to the key update module with the key and the input vector. Accordingly, to generate an updated key of sufficient length, the previous key can be compressed or split into separate parts, such as left and right (based on the number of bits) and combined with the output or updated output to generate the updated key. Complete replacement of the key by the output may also be used, if the output length/key length ratio allows this, before processing part of the input and thus updating the updated key. It can be appreciated that alternative techniques to generate the updated key may also be used, such as the use of salts to pad some or all of one or more of the output or updated output and the previous key to generate the updated key.

The described aspect provides a leakage resilient type scheme that does not rely on key agreement between parties. This allows reproduction and/or verification of previous transactions or message authentication codes. Additionally, the current approach only utilizes an interim or updated key once—there is no session key per se, instead an updated key is generated for every instance by either progressing further along the values of the input vector or by providing a new input vector.

In a second aspect, there is provided a method of providing a secure communication of data between a client device and a host device, said method comprising:

providing a client device with a client microprocessor and client memory wherein the client device comprises a key stored within the client memory;

providing a host device with a host microprocessor and host memory;

establishing a secure connection between the host device and the client device;

supplying at least one input vector to the client device from the host device;

deriving at least one updated key and at least one updated output based on the input vector using at least part of the methods of the first aspect; and using said updated ouput(s) for encrypting communication between the client device and the host device by using the output as a keystream.

Such aspect may be beneficial in communication protocol between proximity coupled devices and proximity integrated circuit chips. Smartcards are one example of such chips, together with RFID devices. Such devices require authentication between a host device and a client device. Additionally, such devices can allow a client device to supply evidence of the possession of a key to the host device based on an input vector supplied by the host device.

In the above described aspects, the encryption module can be a block cipher according to any encryption algorithm. Such encryption algorithms include the PRESENT algorithm, or the Advanced Encryption Standard algorithm. Utilising existing block ciphers that may also provide alternative functionality on the device allow the gate equivalent (ge) footprint of the described cryptographic key generation to be kept to a minimum. This allows a low cost to the device.

In another related aspect, there is provided a method of encrypting data, said method comprising:

providing a cryptographic device with a microprocessor and memory wherein the device comprises a key stored within the memory and an encryption module;

supplying an input vector to the device;

deriving an updated key, based on the input vector and a pseudo-random output, using the method of at least part of the first aspect;

supplying data to be encrypted; and encrypting the data using the updated key.

In other embodiments, the encryption module could be utilised for authentication protocol such that the protocol is not vulnerable to DPA attacks. This improves the security of such authentication protocols.

One further aspect may be directed towards an integrated circuit for a cryptographic device comprising a microprocessor and memory, wherein the device comprises a key stored within the memory, an encryption module and a key update module, whereby the integrated circuit is configured to perform the method of any preceding aspect.

This aspect provides security for a cryptographic device against implementation attacks, such as side-channel attacks.

In a further aspect, there is provided a method of message authentication code generation, said method comprising:

providing a cryptographic device with an integrated circuit according to the integrated circuit aspect described above;

supplying an input vector and a constant input to the device;

deriving an updated key and an updated output, based on the input vector, using the method of at least part of the first aspect; and using the updated output as a message authentication code.

Additionally, the input vector can be concatenated with a counter to produce several inputs and therefore a longer output.

In embodiments, the encryption module may be a decryption module or an encryption and decryption module.

Using a standard encryption module, such as a symmetric block cipher, with the method as outlined above provides encryption keys that make implementation attacks like differential power analysis and fault attacks, etc. impossible without any special countermeasures, except for simple power analysis (SPA) resistance by e.g. parallelism, within the block cipher implementation itself. By repeatedly executing the block cipher while the data input is held constant (e.g. all 0, all 1), the key is modified based on the input vector starting from the original cipher key. This allows having "a secure by design" approach without expensive countermeasures and the need for detailed side-channel analysis. The disclosure can replace a standard block cipher within, for instance, an authentication protocol.

There may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program.

The computer program may be provided on a computer readable medium, which may be a physical computer readable medium, such as a disc or a memory device, or may be embodied as a transient signal. Such a transient signal may be a network download, including an internet download.

BRIEF DESCRIPTION OF DRAWINGS

The disclosure will now be described with reference to the following figures in which like reference numerals are used to denote like elements.

Figure 1:
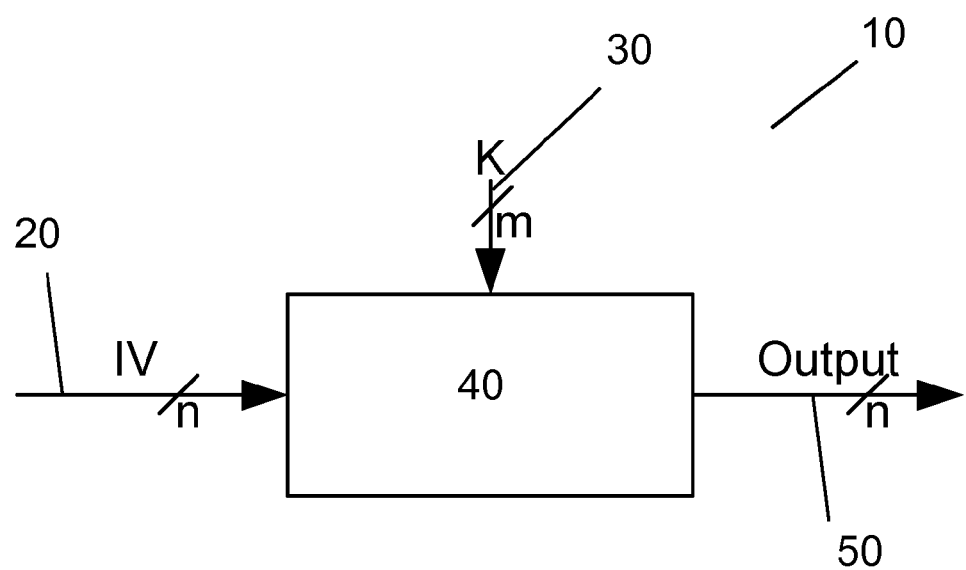
FIG. 1 is a block diagram of a prior art security service.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION

FIG. 1 shows a prior art security service 10 with an input IV (input vector) 20, key (K) 30, block cipher 40 and output 50. The operation of such a prior art security service is that the input vector 20 is encrypted using the key 30 to provide an encrypted cipher text or output 50. The block cipher 40 provides instructions of how to encrypt the input using the key.

An attack method is to examine the internal code, e.g. the S-box, of the block cipher. One method for doing this is using side-channel attacks. For example, by analysing the electromagnetic power consumption and utilising statistics, it is possible to determine the structure of the S-box. Such attacks are often called differential power analysis attacks.

Security services such as the one shown in FIG. 1 may be employed on servers or hosts, for example a computer or a proximity coupling device, that is used to read and communicate with passive devices such as radio-frequency identification (RFID) tags.

Figure 2:
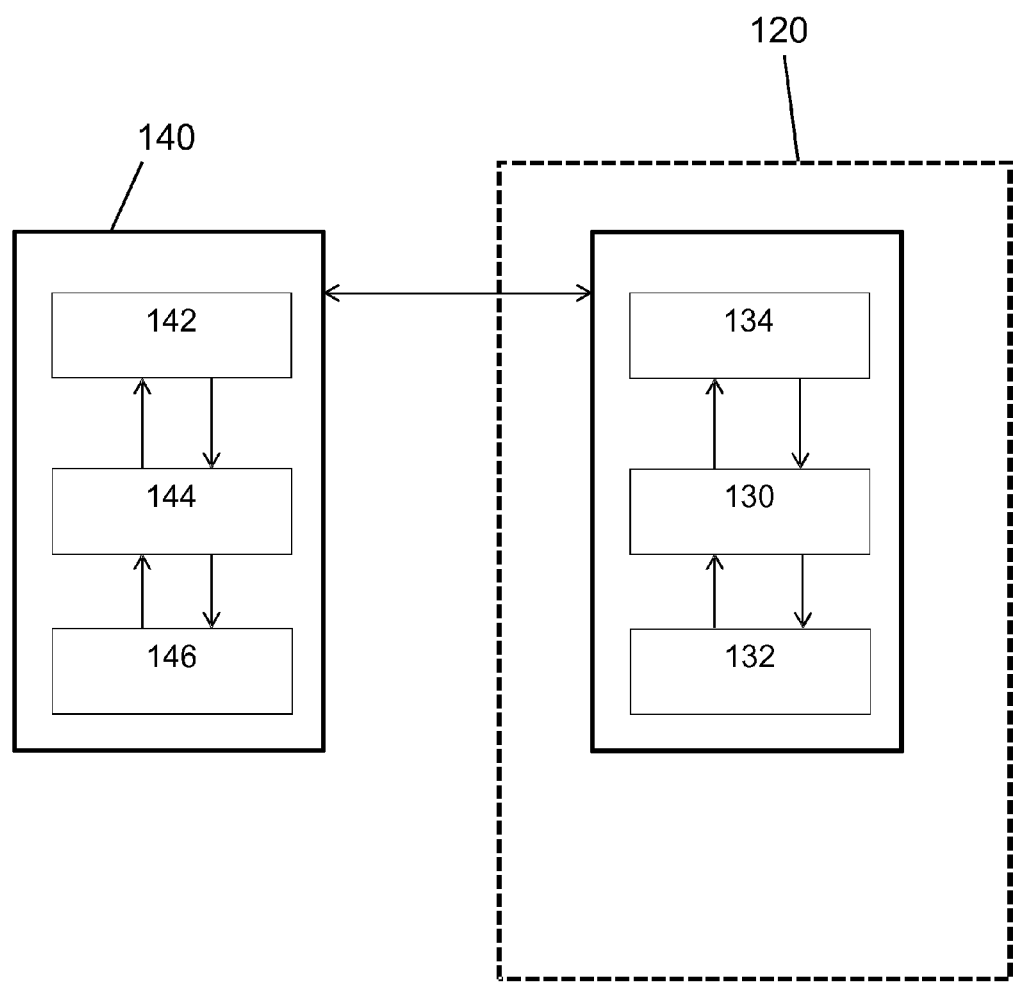
FIG. 2 is a block diagram of communication between a host device and a client device.

FIG. 2 shows an example of a host 120 and a client passive device 140. In the example shown, the host 120 may be a proximity coupling device (PCD), and the client device 140 may be a proximity integrated circuit chip (PICC), such as a RFID tag or a smartcard 140 suitable for use in the key distribution protocol in accordance with the present disclosure. The host 120 in this embodiment is a computer which includes a processor 130, a memory 132 and a card interface 134. The smartcard 140 includes an input/output interface 142, a processor 144 and a memory 146. The host 120 communicates with the smartcard 140 via the card interface 134 and the input/output interface 142. The processor 144 may be a microprocessor or a finite state machine configured to provide cryptographic processing operations as described in greater detail below. The memory 146 of card 140 may be an electronic static or dynamic random access memory (RAM), a magnetic memory or other suitable arrangement of information storage elements. The card interface 134 and input/output interface 142 may be in conformance with a standard card interface such as the personal computer memory card interface adaptor (PCMCIA) standard or a contactless communication interface like ISO 14443.

In an exemplary embodiment of the disclosure as shown in FIG. 2, the card 140 is used to generate a key stream. A process operating on host 120 then provides an encrypted data input to the card for decryption. The card 140 then performs decryption using the key stream. This allows the card 140 to be implemented as a device with relatively limited computational power and low input/output bandwidth. The card 140 in this example will be assumed to operate as a stateless device, such that the current output depends only on the current input and not on any prior inputs. For a given input n, the card 140 will thus output a function with a value determined by the input n, the secret key K stored in memory 146, and a random or pseudo-random bit sequence generated in card 140 or supplied to card 140 via host 120. This assumption recognizes that many currently available smart cards include limited memory, processing and input/output capabilities.

The present disclosure utilises a single constant, the key, which is combined with a known input to generate a pseudo-random output. As noted, in order to prevent an attack using side-channel attacks like differential power analysis attacks, one technique is to change the key on a frequent basis or to build the hardware to prevent attack.

Figure 3:
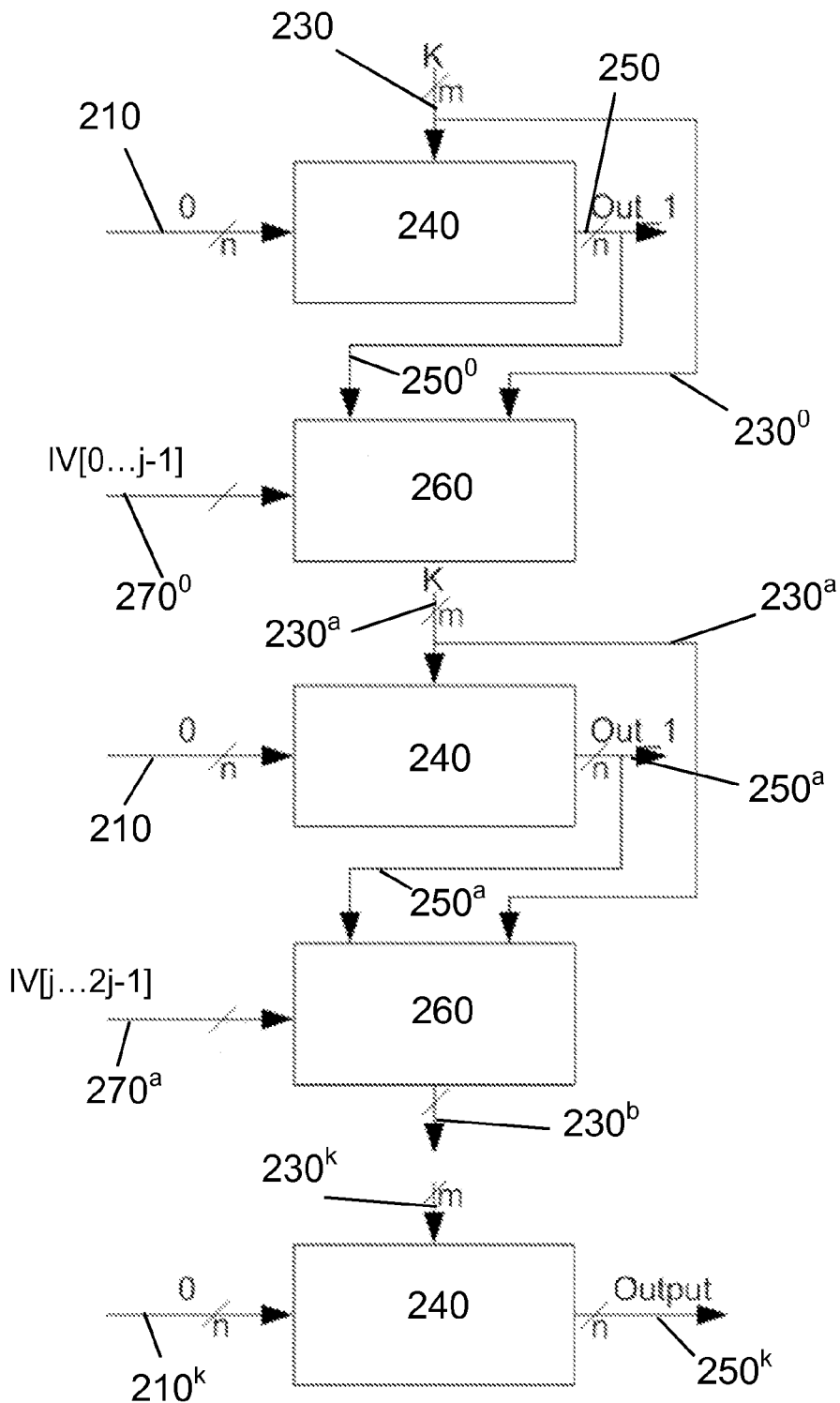
FIG. 3 is a cryptographic primitive according to the present invention.

FIG. 3 describes the process of securing a cryptographic process against implementation attacks, such as side-channel attacks. In a similar manner to that shown in FIG. 1, an encryption module, such as a block cipher 240, is configured to produce an output 250 based on a constant input 210 and a key 230. In the example shown, the input 210 is n bits long, key 230 is m bits long and the corresponding output 250 is n bits long. In example shown, the input 210 has a 0 value (i.e. the value of all n bits are 0). It can be appreciated that the inputs and outputs may be of arbitrary length. Typically, the key is 128 bits long.

The output 250 is fed into a key update module 260 together with the value of the key 230. An input vector 270 is also provided to the key update module 260. The input vector is fed into the key update module chunk-wise (i.e. in chunks, such as byte by byte). In FIG. 3, the input vector 270 is k*j bits long and fed into the key update module 260 in chunks of j bits. The first iteration feeds in bits [0 . . . j-1], the second [j . . . 2j-1] bits until the final chunk of [(k-1)j . . . kj-1]. This divides the input vector 270 into a number of parts $270^0$, $270^a$ . . . $270^k$. The key update module 260 contains a key update function (see FIG. 4) that provides (in the first iteration) an updated key $230^a$. One part $270^0$ of the input vector 270 can also be provided to the key update module 260 (i.e. the input vector is provided bitwise, a single bit at a time). The value of the single bit or chunk provided by the input vector $270^0$ to the key update module 260 determines how the key 230 is updated. Based on the value of the single bit or chunk provided by the input vector $270^0$ (or $270^a$, . . . $270^k$), the output $250^0$ (or $250^a$, . . . $250^k$), the value of the key $230^0$ (or $230^a$ . . . $230^k$) and the key update function within the key update module 260, an updated key $230^a$ (or $230^b$, . . . $230^k$) is provided by the key update module 260.

Figure 4:
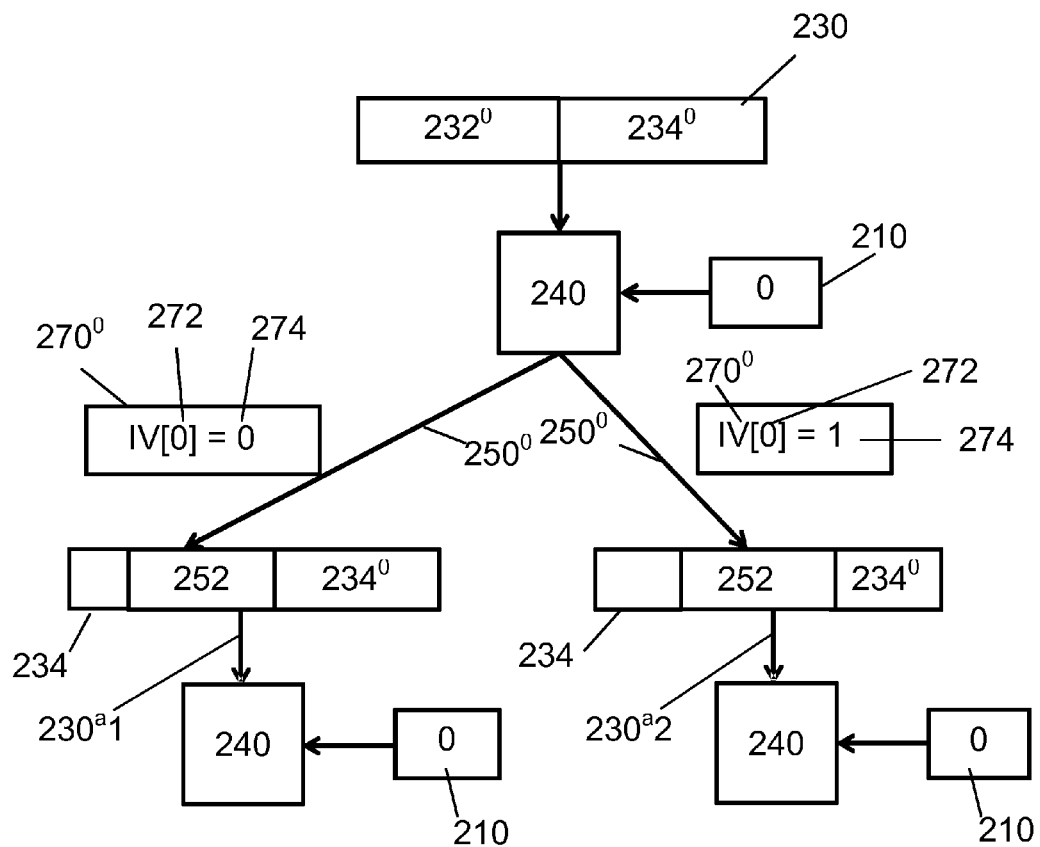
FIG. 4 is a flow diagram of the cryptographic primitive of FIG. 3.

The process described above is repeated for every part or bit of the input vector 270. Accordingly, as shown in FIG. 4, the updated key $230^a$ is provided to the block cipher 240 together with an input 210 (again, in the example shown, the input 210 has a 0 value). Given that the value of the key $230^a$ has changed, the output value $250^a$ is also different from the output 250 of the 1$^{st}$ iteration. Again, the output $250^a$ and the updated key $230^a$ are provided to the key update module 260 together with the next bit of the input vector $270^a$. Based on the value of the next bit of the input vector $270^a$, the updated output $250^a$ and updated key $230^a$, the key update function of the key update module 260 provides a 2$^{nd}$ updated key $230^b$.

The above described process is iteratively repeated for all bits of the input vector 270 until a (final iteration) updated key $230^k$ is provided. This updated key $230^k$ can then be combined with the input $210^k$ and supplied to the block cipher 240 to provide an output value $250^k$. The output $250^k$ can be used as a keystream. The output $250^k$ can be also used to feed a keystream generation function. The output $250^k$ can be used as a message authentication code for the input. The output $250^k$ can be also used to feed a message authentication code generation function.

FIG. 4 details the cryptographic primitive, and in particular the key update function within the key update module 260, as shown in FIG. 3. In FIG. 4, the key 230 comprises a left half $232^0$ and a right half $234^0$. Each half of the key 230 contains half the bits of the key, so for a 128 bit key, the left half contains bits 127:64 and the right half contains bits 63:0. The key 230 is provided to an encryption module 240 such as a block cipher, together with an input 210. The output $250^0$ is the ciphertext (C0) 252 output by the encryption module 240. In addition to the key, encryption module and input, an input vector $270^0$ is provided, which is analysed bitwise, such that the value 274 of each bit 272 of the input vector $270^0$ is determined. Dependent upon the value 274 of the bit 272 of the input vector $270^0$, the key $230^a$ is derived using a concatenation of the ciphertext output 252 and the original key 230. In the example shown, both values of the input vector specify that the output 252 is concatenated with the right hand side $234^0$ of the original key 230. The left hand side $232^0$ of the original key is discarded. Dependent upon the value 274 of the selected bit 272 of the input vector $270^0$, an operation may be performed on the right hand side $234^0$ of the original key. For example, as shown in FIG. 4, a value 274 of 0 for bit 272 results in a first rotation of the right hand side of the key $234^0$ by a value of 1 bit (i.e. the position of the output 252 C0 in relation to the right hand side of the key $234^0$). Conversely, a value 274 of 1 for bit 272 results in a different rotation of the key, in the example shown a 2 bit rotation, and a different position of the output 252 relative to the right hand side of the key $234^0$. In both cases, this forms an updated key $230^a1$ or $230^a2$.

It can be seen that if a 128 bit original key is used with a 64 bit input, the output value can be 64 bits long. Concatenating this output value with half the original key provides a 128 bit updated key. The form of the concatenation may depend on the value 274 of the bit 272 of the input vector 270. The form of the concatenation may also take alternative forms, such as the use of salts, constants, counters, nonces or other cryptographic constructs.

It can be appreciated that other functions may be performed on the key in addition to or as an alternative to concatenations. For example, the right hand side 234 of the key may be rotated by several bits. The example shown in FIG. 4 utilises a simple compression of the original key to provide the updated key. Expansion and other permutations may also be used.

Figure 5:
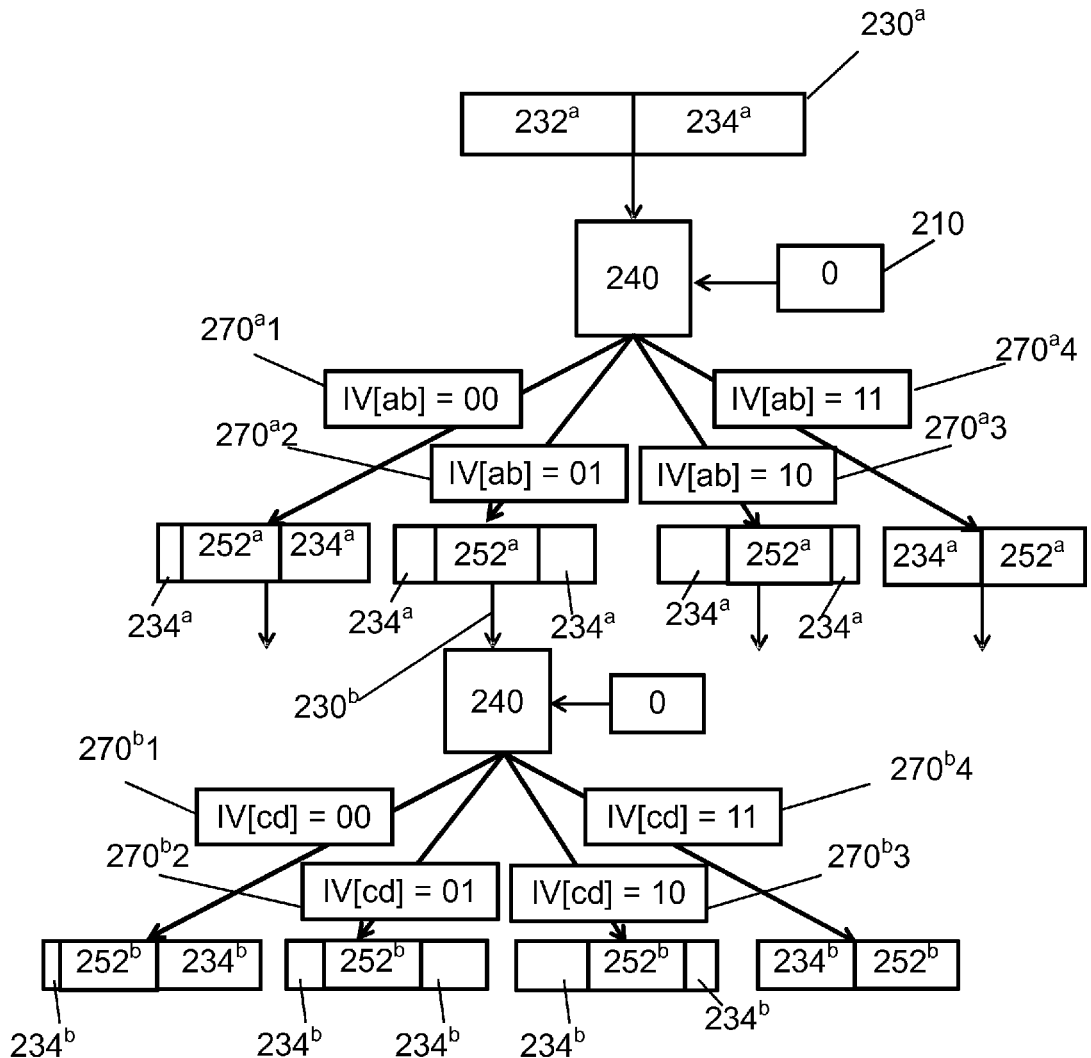
FIG. 5 is an alternative flow diagram of the cryptographic primitive of FIG. 3.

It can also be appreciated that the functions performed on the key may depend on more than one bit of the input vector 270. One such example is shown in FIG. 5. FIG. 5 shows an alternative construction of the single iteration of the primitive shown in FIG. 4. In this variant, the value of two bits of the input vector 270 are considered. It can be appreciated that any part (i.e. 1 or more bits) of the input vector 270 may be applied.

For example, input vector $270^a$ provides alternative tree paths $270^a1$, $270^a2$, $270^a3$, $270^a4$ for updating the key. The path $270^a1$, $270^a2$, $270^a3$, $270^a4$ chosen depends upon the value of bits ab of the input vector. In the example shown, a value of 00 for bits ab is path $270^a1$, which leads to a concatenation of the right hand side of the key $234^a$ with the output $252^a$, with a rotation of the key to the right by 1 bit. Path $270^a2$, bit value 01, leads to an alternative concatenation between the right hand side of the key $234^a$ and the output $252^a$ with a 2 bit rotation applied to the key. Bit values of 10 leads to path $270^a3$ and a concatenation of right hand side of the key $234^a$ and output $252^a$ with a 3 bit rotation and finally value 11 to path $270^a4$ and alternative concatenation of path $270^a3$ with 4 bit rotation.

Dependent upon the determined value of the input vector bits, an updated key $230^b$ is derived based on the value of the original key and the output. The updated key may then be further modified by analyzing the bit values of bits cd of the next chunk of the input vector $270^b$, leading to concatenation of the left $232^b$ and right $234^b$ hand sides (only right hand side $234^b$ shown in FIG. 5) of the updated key $230^b$ (again with a rotation applied dependent upon the value of the bits cd) with an updated output value $252^b$. Alternative paths $270^b1$, $270^b2$, $270^b3$, $270^b4$ are possibilities depending upon the value of the bits cd of the input vector 270 for the second iteration.

The size of the part of the input vector 270 may allow a greater number of possible transformations or updates of the key dependent upon the value of the part of the input vector. For example, using an 8 bit part of the input vector provides a multitude of paths for the key update function. Using a larger bit value for the part of the input vector also allows a shorter process.

The present disclosure reduces the need for key randomness. It allows encryption based upon any constant. By varying the value of the input vector, the final updated key $230^k$ is also varied. Additionally, for every key there is only one input and therefore only a single power measurement. Because of this, statistical side-channel attacks like differential power attacks are ineffective.

The present disclosure describes processing the input in a bit wise manner. Accordingly the output for an arbitrary length input would be a n-bit output. In general, the constant is encrypted using a key. In the present example a value of 0 is used, however the input can be of arbitrary length and value. After the encryption of the constant using the key, the input factor is subdivided and used to modify the key in a stepwise manner. This creates a treelike structure for the key. This also creates a pseudo-random function.

The key update function of the key update module 260 may be applied to any encryption protocol. By only producing a single power trace per key, side-channel attacks are prevented. Additionally, there is no randomness that is uncontrollable from the outside. Every transaction can be identically replayed. Provided the same input vector 270 is provided, the final updated key $230^k$ will be the same.

Unlike other encryption rekeying methods there is no session key. Instead, for each iteration of the bit value of the input vector, the previous key is overwritten. Accordingly, it is not possible to determine or recreate the previous key from the session key and therefore the master key is not vulnerable.

Another application of the present disclosure may be in authentication. Referring to FIG. 2, the proximity integrated circuit chip is able to store a master key 230 within the client memory 146. Upon contact between the client device 140 and the host device 120, a standard authentication protocol may be used to determine that both the host and client are mutually trustworthy. The client device 140 can apply the pseudo-random function described above using a received input vector from the host device 120 to generate an output. This output can at this stage be seen as a message authentication code (MAC) and can then be transferred to the host device via the I/O and card interfaces 134, 142.

From reading the present disclosure, other variations and modifications will be apparent to the skilled person. Such variations and modifications may involve equivalent and other features which are already known in the art of cryptography and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom. For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A computer-implemented method for securing a cryptographic device configured to use a plurality of keys with a single power trace per key against implementation attacks, the computer-implemented method, for each key, comprising:

obtaining a particular key from a memory of the cryptographic device;

providing the particular key and a constant input to an encryption module, wherein an identical constant input is used for all keys of the plurality of keys;

deriving an output of encrypted data bits using the encryption module;

providing the output, the particular key, and an input vector to a key update module; and using said key update module to modify the particular key based on a first part of the input vector to derive an updated key, wherein the key update module only produces the single power trace per key.

2. The method of claim 1, further comprising:

providing the updated key and the constant input to the encryption module; and deriving an updated output using the encryption module.

3. The method of claim 2, further comprising:

providing the updated output, the updated key, and the input vector to the key update module; and using said key update module to modify the updated key based on a second part of the input vector.

4. The method of claim 3, further comprising:
deriving a first pseudo-random output.

5. The method of claim 4, further comprising:
providing additional input vectors;
deriving additional pseudo-random outputs for each additional input vector; and
concatenating the additional pseudo-random outputs with the first pseudo-random output to form a larger pseudo-random output.

6. The method of claim 2, wherein the updated key is a concatenation of at least part of each key and at least part of the updated output.

7. The method of claim 1, wherein the first part of the input vector comprises values of at least one bit of the input vector.

8. The method of claim 1, wherein the key update module modifies each key using one or more of compression, expansion, or permutation operations.

9. The method of claim 8, wherein an operation used to modify each key is chosen dependent on the first part of the input vector supplied to the key update module.

10. The method of claim 1, wherein the key update module rotates parts of each output, concatenated with parts of each key, by a number of bits.

11. The method of claim 10, wherein the number of bits is dependent on a first part of the input vector.

12. The method of claim 1, wherein the encryption module is a block cipher.

13. The method of claim 1, wherein the input vector provides a plurality of alternative tree paths for the key update module.

14. The method of claim 13, wherein the key update module is configured to use a different bit rotation for each tree path.

15. The method of claim 1, further comprising:
overwriting a previous key for each iteration of a bit value of the input vector.

16. An integrated circuit for a cryptographic device comprising:
a microprocessor and the memory, wherein the cryptographic device comprises a key stored within the memory, the encryption module, and the key update module, whereby the integrated circuit is configured to perform the computer-implemented method of claim 1.

17. A computer-implemented method of providing a secure communication of data between a client device and a host device, wherein the client device is configured to use a plurality of keys with a single power trace per key against implementation attacks, said method comprising:
providing the client device with a client microprocessor and a client memory, wherein the plurality of keys are stored within the client memory;
providing the host device with a host microprocessor and a host memory;
establishing a secure connection between the host device and the client device;
supplying, for each key, at least one input vector to the client device from the host device;
deriving an updated key and an updated output based on the input vector and a constant input, wherein an identical constant input is used for all keys of the plurality of keys and deriving the update key only produces the single power trace per key; and
using said updated output to encrypt communication between the client device and the host device by using the updated output as a keystream.

18. A computer-implemented method of message authentication code generation, wherein a cryptographic device is configured to use a plurality of keys with a single power trace per key against implementation attacks, said method comprising:
providing the cryptographic device configured to use the plurality of keys with an integrated circuit;
supplying an input vector to the cryptographic device;
supplying a constant input to the cryptographic device, wherein an identical constant input is used for all keys of the plurality of keys;
deriving an updated key and an updated output, based on the input vector, wherein deriving the updated key only produces the single power trace per key; and
using the updated output as a message authentication code.

* * * * *